(No Model.) 2 Sheets—Sheet 1.
E. PARTRIDGE.
AXLE CLIP FOR VEHICLES.
No. 366,425. Patented July 12, 1887.
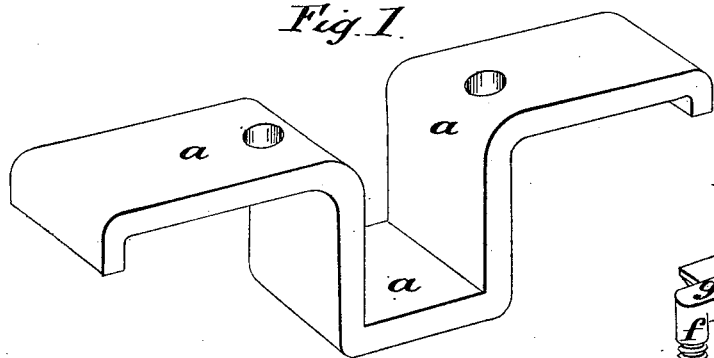
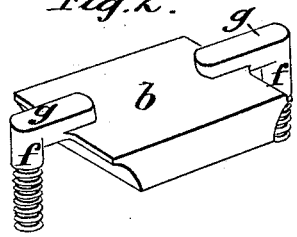
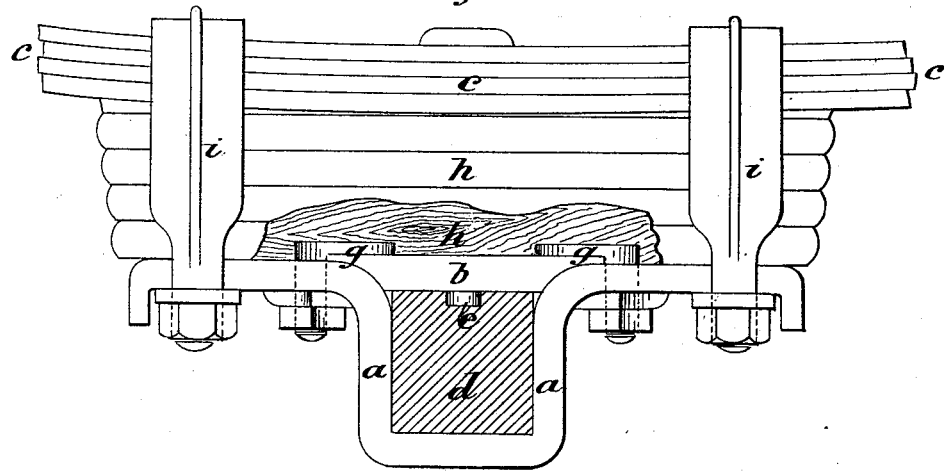
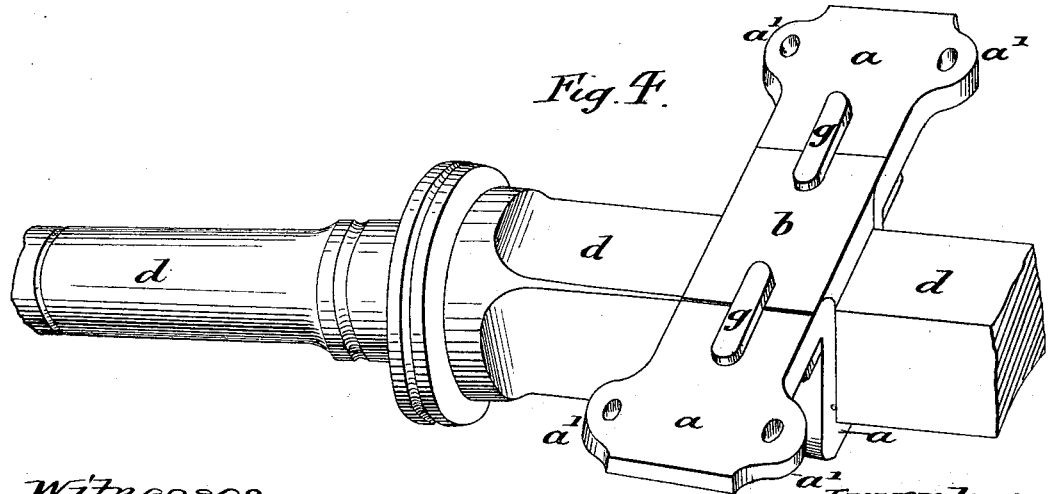
Witnesses:
J. A. Rutherford
Robert Everitt
Inventor
Ebenezer Partridge
By James L. Norris
Atty.

(No Model.) 2 Sheets—Sheet 2.
E. PARTRIDGE.
AXLE CLIP FOR VEHICLES.
No. 366,425. Patented July 12, 1887.
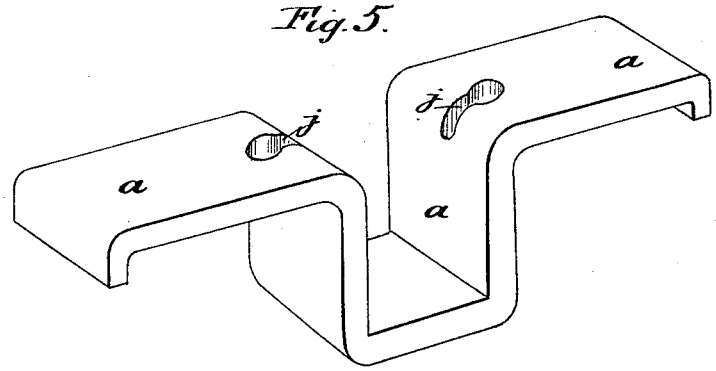
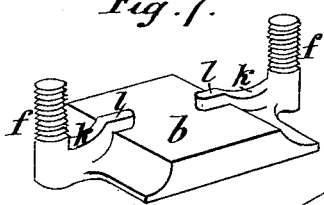
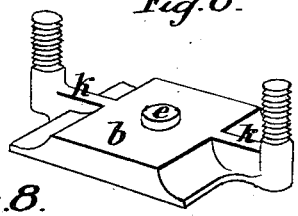
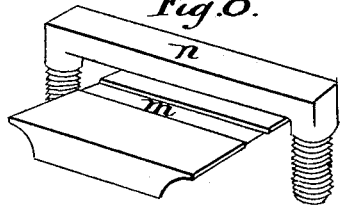
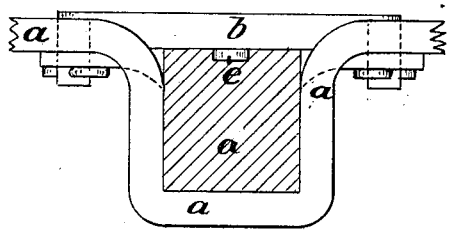
Witnesses
J. A. Rutherford
Robt Everett
Inventor
Ebenezer Partridge
By
James L. Norris
Atty

UNITED STATES PATENT OFFICE.

EBENEZER PARTRIDGE, OF EDGBASTON, BIRMINGHAM, ENGLAND.

AXLE-CLIP FOR VEHICLES.

SPECIFICATION forming part of Letters Patent No. 366,425, dated July 12, 1887.

Application filed January 22, 1887. Serial No. 225,159. (No model.) Patented in England November 9, 1886, No. 14,475.

*To all whom it may concern:*

Be it known that I, EBENEZER PARTRIDGE, a subject of the Queen of Great Britain, residing at Litho Villa, Poplar Avenue, Edgbaston, Birmingham, England, have invented Improvements in Devices for Attaching Axles to Vehicles, (for which I have obtained a patent in Great Britain, No. 14,475, bearing date November 9, 1886,) of which the following is a specification, reference being made to the accompanying drawings, in which—

Figure 1 is a perspective view of the lower part of the clip; Fig. 2, a similar view of the top plate or bridge-piece; Fig. 3, a broken sectional elevation showing the invention applied to the springs and axle; Fig. 4, a perspective view of an axle with my invention applied; Figs. 5, 6, 7, 8, and 9, perspective detail views showing modifications of the clip, hereinafter described.

The object of this invention is to construct an affixable solid flap for road-axles from a combination of a clip for encircling three sides of a square and a top plate or bridge with a screw-pin to each wing, and is also provided with a stud on its under surface for insertion into a hole made in the upper part of the axle to fix said top plate in the required position; or one stud each side of plate may be used. The wings of the flap or clip are provided with holes, through which said plate screw-pins are passed for securing said top plate firmly in place; or said screw-pins may be plain for riveting to clip; or a hole can be put in said plate and loose screw or plain pins passed through; or a loose band-clip can be made to go across top plate and bent to suit holes in flap-clip. The top plate has its edges hollowed, to correspond to the curve or rounded bend of the flap (or clip) to form a perfect joint and bearing therewith, and its upper surface is preferably flush with the wings of the flap. The top exposed surface of the top plate has projections forming keys to take into the wood spring-blocks, to prevent shifting.

My invention will be clearly understood by reference to the annexed drawings, in which—

Figs. 1 and 2 are perspective views of the flap (clip) or lower plate, $a$, and the bridge or top plate, $b$, respectively.

Fig. 3 is a part sectional elevation showing the affixable solid flap in position attached to the spring $c$ and axle $d$, and Fig. 4 is a perspective view of the axle and affixable solid flap having butterfly flaps $a'$. $e$ is the stud on the bridge-plate $b$ for insertion into the axle $d$, and $f f$ are the pins for attaching said plate $b$ and the flap or clip $a$ to each other. $g\ g$ are the projections forming keys to take into the wood spring-block $h$, the affixable solid flap being finally secured to the spring $c$ by the clips $i\ i$.

Fig. 5 is a perspective view of a modified lower plate, $a$, in which are elongated holes $j\ j$, for the reception of the cross-keys $k\ k$ on the bridge-plate $b$, as shown at Fig. 6.

In Fig. 7 I show a modification of the center stud, $e$, made by projections $l\ l$ on the two cross-keys $k\ k$ of the top plate, formed of a flat plate, $b$, with cross-groove $m$, into which I drop the ∩-piece or band-clip $n$, for securing to the lower plate, $a$, to form an affixable solid flap.

Fig. 9 shows the upper and lower plates secured by means of plain pins $f$; but I do not limit myself to any particular methods of securing said upper and lower plates together, so that they are affixable to make an axle-clip equivalent to the usual welded solid flap.

The flap (or clip) constructed as above described, and used in combination with the top bridge-plate and screw-pins, constitutes, when applied to and fixed on an axle, a solid flap, and is an exact equivalent to the usual welded solid flap.

Axles by the use of my invention are considerably strengthened and greatly improved in simplicity of construction and application.

I claim as my invention—

1. The combination, with the axle $d$, of the clip $a$, embracing the axle, and the bridge-piece $b$, having a projection, $e$, entering a recess in the top surface of the axle and provided with the pins $f$, passing through the clip and secured substantially as described.

2. The combination, with the axle $d$, of the clip $a$, embracing the axle, and the bridge-piece $b$, having the projection $e$ on its under side, the projections $g$ on its upper side, and the pins $f$, passing through the clip and secured substantially as described.

3. The combination, with the axle $d$ and wood spring-block $h$, of the clip $a$, embracing the axle, and a bridge-piece connected with the clip between the block and axle, and having projections engaging recesses in said block and axle, respectively, substantially as described.

4. The combination, with the axle $d$ and wood spring-block $h$, of the clip $a$, embracing the axle, and the bridge-piece connected with the clip between the axle and the block, and having a projection engaging a recess in the axle, substantially as described.

In witness whereof I have hereto set my hand in the presence of two subscribing witnesses.

EBENEZER PARTRIDGE.

Witnesses:
 HENRY GARDNER,
  *Patent Agent,*
 RICHARD CORE GARDNER,
*Both of* 166 *Fleet Street, London, England.*